(12) United States Patent
Tasaka

(10) Patent No.: US 11,153,674 B2
(45) Date of Patent: Oct. 19, 2021

(54) SOUND REPRODUCTION DEVICE

(71) Applicant: EARFREDO CO., LTD., Takarazuka (JP)

(72) Inventor: Shuichi Tasaka, Tokyo (JP)

(73) Assignee: EARFREDO CO., LTD., Hyogo (JP)

( * ) Notice: Subject to any disclaimer, the term of this patent is extended or adjusted under 35 U.S.C. 154(b) by 0 days.

(21) Appl. No.: 16/760,133

(22) PCT Filed: Mar. 29, 2018

(86) PCT No.: PCT/JP2018/013496
§ 371 (c)(1),
(2) Date: Jul. 2, 2020

(87) PCT Pub. No.: WO2019/087428
PCT Pub. Date: May 9, 2019

(65) Prior Publication Data
US 2020/0336820 A1    Oct. 22, 2020

(30) Foreign Application Priority Data

Oct. 30, 2017  (JP) .............................. JP2017-209167
Feb. 9, 2018   (JP) .............................. JP2018-021622

(51) Int. Cl.
*H04R 1/10*    (2006.01)
*G11B 33/04*   (2006.01)
*H04N 5/38*    (2006.01)
*H04N 5/76*    (2006.01)

(52) U.S. Cl.
CPC .......... *H04R 1/1041* (2013.01); *G11B 33/04* (2013.01); *H04N 5/38* (2013.01); *H04N 5/76* (2013.01); *H04R 1/1025* (2013.01); *H04R 2420/07* (2013.01)

(58) Field of Classification Search
CPC .... H04R 1/1041; H04R 1/1025; G11B 33/04; H04N 5/38; H04N 5/76
See application file for complete search history.

(56) References Cited

U.S. PATENT DOCUMENTS

| 2009/0046869 A1 | 2/2009 | Griffin, Jr. et al. |
| 2010/0245585 A1 | 9/2010 | Fisher et al. |
| 2014/0314245 A1 | 10/2014 | Asada et al. |
| 2016/0049012 A1 | 2/2016 | Torii et al. |

(Continued)

FOREIGN PATENT DOCUMENTS

| JP | 2013-102370 A | 5/2013 |
| JP | 2015-043576 A | 3/2015 |

(Continued)

OTHER PUBLICATIONS

Official Communication issued in International Patent Application No. PCT/JP2018/013496, dated Jun. 12, 2018.

*Primary Examiner* — Simon King
(74) *Attorney, Agent, or Firm* — Keating & Bennett, LLP

(57) ABSTRACT

Provided is a sound reproduction device that includes a cradle that functions as a GUI of a wireless earphone, and does not need additional use of a display terminal. The sound reproduction device includes a wireless earphone 1, and a cradle 50 that houses the wireless earphone, wherein the cradle 50 includes a chargeable battery for charging the wireless earphone 1, and a touch panel 51 that functions as an input/output interface of the wireless earphone 1.

17 Claims, 12 Drawing Sheets

(56) References Cited

U.S. PATENT DOCUMENTS

| | | | | |
|---|---|---|---|---|
| 2016/0134961 A1* | 5/2016 | Shaffer | ................ | H04R 1/1091 |
| | | | | 381/74 |
| 2017/0093079 A1* | 3/2017 | Wagman | ................ | B65D 25/02 |
| 2017/0109131 A1* | 4/2017 | Boesen | ................... | G06F 3/012 |
| 2018/0091884 A1* | 3/2018 | Minoo | ................. | H04R 1/1091 |
| 2018/0116514 A1* | 5/2018 | Turner | ................. | A61B 5/7203 |

FOREIGN PATENT DOCUMENTS

| | | |
|---|---|---|
| JP | 2016-040865 A | 3/2016 |
| JP | 2017-099259 A | 6/2017 |
| WO | 2017/058675 A2 | 4/2017 |

\* cited by examiner

SOUND REPRODUCTION DEVICE

TECHNICAL FIELD

The present invention relates to a sound reproduction device, such as an earphone used in a state of being connected to a player; it particularly relates to a wireless sound reproduction device that does not need cable connection with a player.

BACKGROUND ART

Conventionally, wireless earphones that do not need a cable for the connection with a player has been known as earphones that are used in a state of being connected to a device having a function of reproduction of music and the like (hereinafter referred to as a "player" generally), such as an audio player and a smartphone. Wireless earphones, when paired with a player via wireless communication such as Bluetooth (registered trademark) are capable of wireless reception and reproduction of signals for music. As a result, as compared with wired earphones linked with a player via a cable, such wireless earphones are more comfortable and convenient, since a user using wireless earphones by no means catches a cable when walking or doing exercise.

In a case of completely wireless earphones, which have been in market recently, a battery is built in each of the right and left earphones, which enables mutual wireless link between the right and left earphones. This makes it possible to make the earphones further smaller in size and lighter in weight.

In the case of such completely wireless earphones, however, the outer size and thickness of the battery are limited, since the battery is built in each of the right and left earphones. This hinders the battery from having a larger capacity, thereby limiting the playback time to about several hours. To cope with this, the wireless earphones are housed in a case (called "cradle") in which a battery is built when a user does not do viewing and listening, so that the wireless earphones can be charged using the battery in the cradle (see, for example, Patent Document 1 shown below).

PRIOR ART DOCUMENT

Patent Document

Patent Document 1: JP-A-2017-99259

SUMMARY OF THE INVENTION

Problem to be Solved by the Invention

As an earphone is small in size, the earphone itself is not equipped with a display. In recent years, wireless earphones have become highly functional so as to acquire a variety of data with use of sensors inside the wireless earphones, but to visually confirm such data, it is necessary to use a display terminal in addition to the earphones. Besides, when the setting of wireless earphones is changed, such a display terminal is also needed in some cases.

In light of the above-described problems, it is an object of the present invention to provide a sound reproduction device equipped with a cradle that functions as a graphical user interface (GUI) of a wireless earphone without additionally using a display terminal.

Means to Solve the Problem

To achieve the above-described object, a sound information terminal device of the present invention is a sound reproduction device that includes a wireless earphone, and a cradle that houses the wireless earphone, wherein the cradle includes a chargeable battery for charging the wireless earphone, and a touch panel that functions as an input/output interface of the wireless earphone.

Effect of the Invention

With the configuration of the present invention, a sound reproduction information terminal device thus provided is capable of managing and providing information that is useful for a user, only with a wireless earphone, without a smartphone.

MODE FOR CARRYING OUT THE INVENTION

Figure 1:
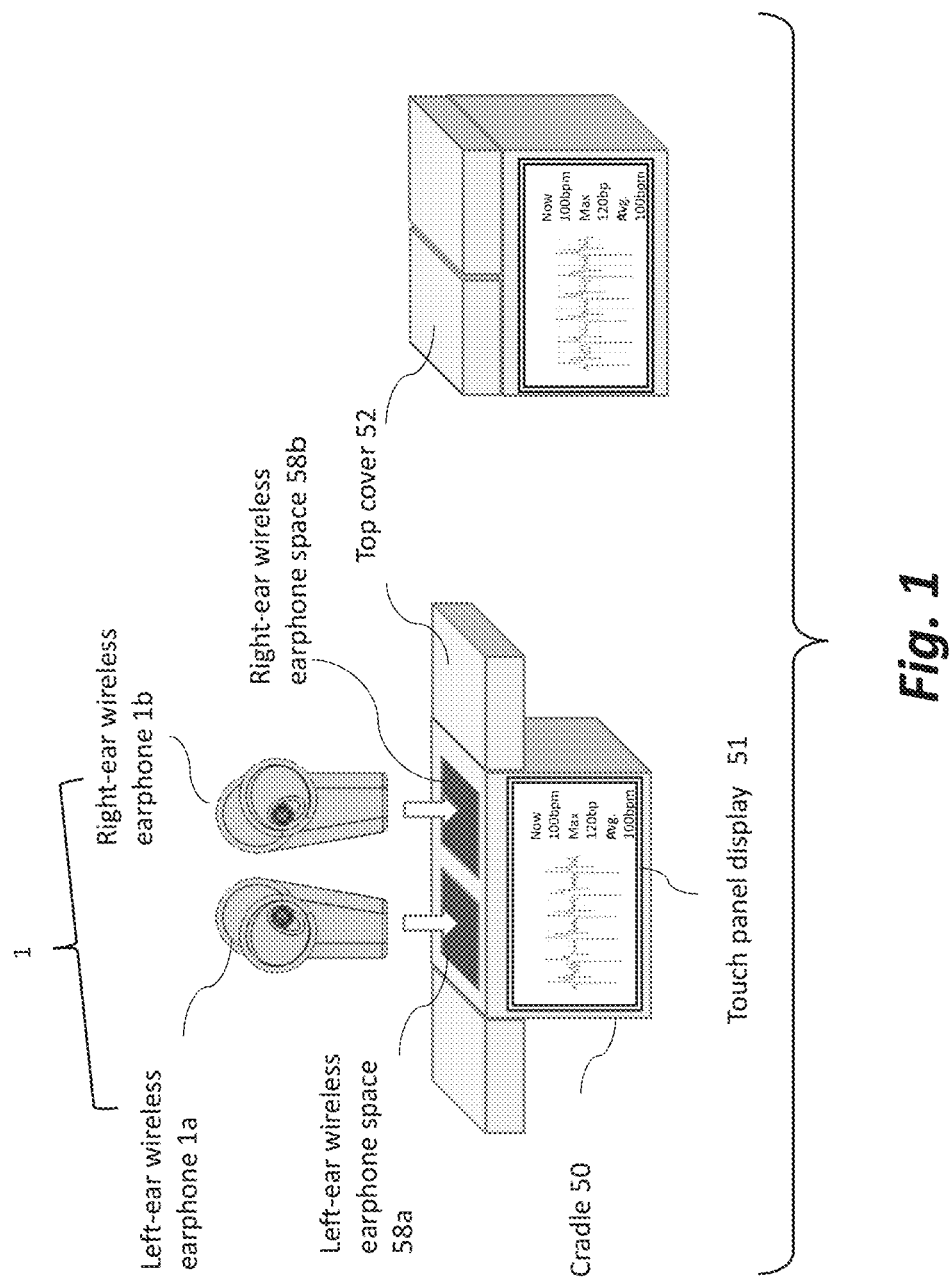
FIG. 1 is an appearance view of wireless earphones and a cradle that constitute a sound reproduction device of Embodiment 1.

The following description describes embodiments of the present invention.

It should be noted that the term "earphone" in the present application means a sound reproduction device of any configuration that a user can wear in his/her ear to listen to sound. An "earphone" is categorized in two types: a type that is inserted into a user's ear canal like an earplug (called a "canal type" in some cases); and a type that is not inserted into an ear canal, but slightly put in an ear hole (called an "in-ear type" or an "inner ear type" in some cases). The term of "earphone" herein encompasses both of these types.

A sound reproduction device according to the first configuration of the present invention is:

a sound reproduction device that includes a wireless earphone, and a cradle that houses the wireless earphone, wherein the cradle includes:

a rechargeable battery for charging the wireless earphone; and a touch panel that functions as an input/output interface of the wireless earphone.

This configuration makes it possible to manage and provide information that is useful for a user, only with a wireless earphone, without a smartphone.

A sound reproduction device according to the second configuration has the first configuration further characterized in that:

the wireless earphone includes a left-ear earphone and a right-ear earphone, and the left-ear earphone and the right-ear earphone are configured so as to be independent from each other.

This configuration makes it possible to provide a sound information terminal device characterized in that either one earphone alone can be used, and frequency characteristics according to differences between auditory senses of the right and left ears, equalizer characteristics according to preference can be set.

A sound reproduction device according to the third configuration has the first or second configuration further characterized in that:

the cradle includes a data transfer port for connection with the wireless earphone housed in the cradle.

This configuration makes it possible to perform not only the charging of the wireless earphone, but also data transfer to/from the cradle main body, when the wireless earphone is housed in the cradle. This allows data exchange between the cradle and the wireless earphone in a short time. For example, it is possible to update a firmware of the wireless earphone.

A sound reproduction device according to the fourth configuration has any one of the first to third configurations further characterized in that:

the wireless earphone includes a microphone.

This configuration makes it possible to perform a hands-free operation when operating the cradle or using external equipment such as a smartphone, by using the microphone built in the earphone.

A sound reproduction device according to the fifth configuration has any one of the first to fourth configurations further characterized in that:

the wireless earphone includes a sensor unit that acquires sensor information that contains at least either motion information or biological information of a user, and the cradle further includes a data processing unit that receives the sensor information from the sensor unit and performs display based on the sensor information on the touch panel.

This configuration makes it possible to acquire history of the user's motions, heart rate, and the like and cause the touch panel of the cradle to display it in a graph form or the like.

A sound reproduction device according to the sixth configuration has any one of the first to fifth configurations further characterized in that:

the wireless earphone further includes a position acquisition unit that acquires coordinate information of a current position.

This configuration, wherein the earphone includes the position acquisition unit utilizing the global positioning system (GPS) or the like, makes it possible, for example when a user is running, to record position information and history during the running and to confirm it on the display of the cradle.

A sound reproduction device according to the seventh configuration has any one of the first to sixth configurations further characterized in that:

the wireless earphone further includes a voice communication unit that performs voice communication with another terminal.

This configuration, wherein the earphone has a voice communication function, makes it possible to perform voice communication even in a state without a smartphone.

A sound reproduction device according to the eighth configuration has any one of the first to seventh configurations further characterized in that:

the wireless earphone further includes an equalizer processing unit that adjusts acoustic frequency characteristics of the wireless earphone, and the equalizer processing unit receives setting of the acoustic frequency characteristics via the touch panel.

This configuration makes it possible to easily set acoustic characteristics according to a user's respective auditory senses on the right and left sides and his/her preference, by setting sound quality equalizing with use of the touch panel of the cradle and confirming the same on the display.

A sound reproduction device according to the ninth configuration has the eighth configuration further characterized in that the wireless earphone includes a microphone, and functions as a hearing aid that reproduces external sound that is taken in through the microphone.

This configuration makes it possible to use the wireless earphone as a hearing aid. Besides, this also allows a user him/herself, using the touch panel of the cradle, to easily perform an adjusting operation such as increasing an acoustic pressure of a frequency in a band that the user has difficulty in hearing.

A sound reproduction device according to the tenth configuration has the fourth configuration further characterized in that:

the wireless earphone further includes a monitor signal adjustment unit that adjusts an acoustic pressure ratio between a reproduction level of the wireless earphone and a monitoring level of external environments acquired through the microphone, and the monitor signal adjustment unit receives setting of the acoustic pressure ratio via the touch panel.

This configuration, in which the ratio between input signals of music from an audio player or the like and a monitoring level of sounds of external environments collected through the microphone is set with use of the touch panel of the cradle, thereby makes it possible to monitor external sounds even in a case where music is listened to in the outdoors. This ensures safety such as the prevention of a traffic accident. When a user does not listen to music, it can be used as a device having a hearing aid function, too.

A sound reproduction device according to the eleventh configuration has any one of the eighth to tenth configurations further characterized in that:

the touch panel separately receives setting for the left ear and setting for the right ear.

This configuration, in which the ratio between input signals of music from an audio player or the like and a monitoring level of sounds of external environments collected through the microphone is set with respect to each of the left earphone and the right earphone separately with use of the touch panel of the cradle, thereby makes it possible to separately use the left and right earphones, for example, so that the left ear can listen to music and the right ear can use the hearing aid function.

A sound reproduction device according to the twelfth configuration has the fourth configuration further characterized in that:

a voice instruction is received through the microphone.

This configuration makes it possible to make a voice instruction regarding, for example, the ratio between input signals of music from an audio player or the like and a monitoring level of sounds of external environments collected through the microphone.

A sound reproduction device according to the thirteenth configuration has the fifth configuration further characterized in that:

the data processing unit updates display based on the sensor information in real time on the touch panel.

This configuration makes it possible to display a heart rate, consumed calories, and the like on the display of the cradle connected via Bluetooth in real time.

A sound reproduction device according to the fourteenth configuration has the fifth configuration further characterized in that:

the sensor unit acquires the sensor information from a user's right and left ears, and the data processing unit displays the sensor information acquired from the right and left ears, in such a manner that the sensor information acquired from the right ear and the sensor information acquired from the left ear can be compared on the touch panel.

This configuration, in which the sensor information from the right ear and the sensor information from the left ear are compared, makes it possible to accurately manage a user's body condition, changes in his/her motor function, and his/her concentration state.

A sound reproduction device according to the fifteenth configuration has any one of the first to fourteenth configurations further characterized in further including:

a reproduction circuit that is capable of reproducing video contents; and a port that is capable of transferring video data reproduced by the reproduction circuit to a head-mounted display.

This configuration makes it possible to make contents of augmented reality (AR), virtual reality (VR), and the like be viewed and listened to in such a manner that the head-mounted display and the wireless earphones operate in an interlocked manner. Further, in a case where the head-mounted display and the wireless earphone are connected via wire, it is unlikely that data delay would occur as compared with a case of wireless connection, and high-resolution video data or audio data can be reproduced without delay.

A sound reproduction device according to the sixteenth configuration has the fifteenth configuration further characterized in that:

the wireless earphone further includes a slot in which a recording medium that is capable of storing the video contents can be installed.

This configuration, in which a recording medium such as a memory card is installed in the main body of the wireless earphone, makes it possible to store high-resolution video contents and audio data of virtual reality contents or augmented reality contents in the wireless earphone. With this, it is possible to view and listen to video contents without streaming or the like.

A sound reproduction device according to the seventeenth configuration has the fifteenth or sixteenth configuration further characterized in that:

the wireless earphone further includes a slot in which a communication control medium for receiving the video contents is installed.

This configuration, in which a communication control medium such as a SIM card is built in the main body of the wireless earphone, makes it possible to allow a user to enjoy streaming videos such as virtual reality contents or augmented reality contents.

A sound reproduction device according to the eighteenth configuration has the third configuration further characterized in that:

the wireless earphone further includes a writable memory unit, and writing to the memory unit via the data transfer port can be carried out in a state in which the wireless earphone is housed in the cradle.

With this configuration, the memory unit of the wireless earphone can be updated in a short time via the data transfer port of the cradle, for example, in a case where data of relatively large capacity has to be transferred, like a case where a firmware of the wireless earphone is upgraded.

Hereinafter, more specific embodiments of the present invention are described with reference to the drawings.

Embodiment 1

Figure 2:
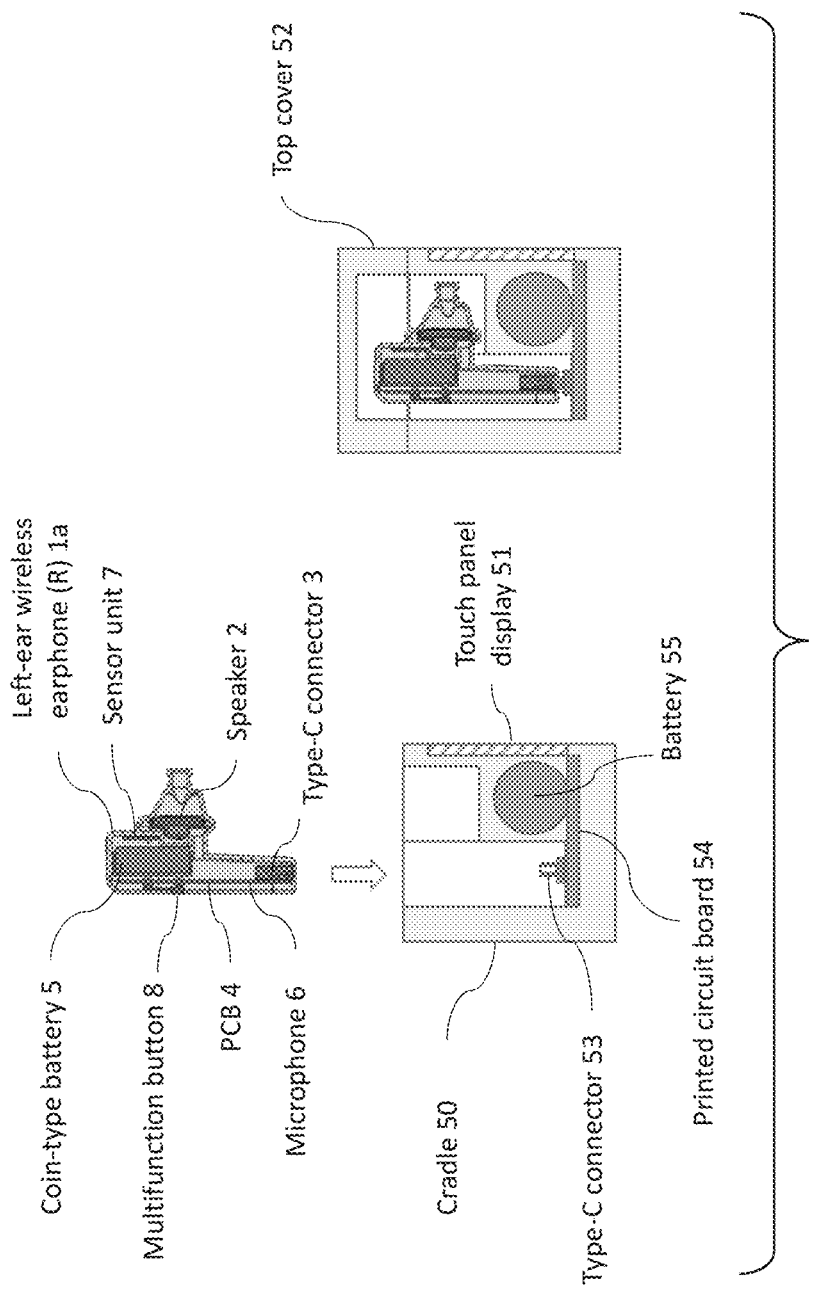
FIG. 2 is a cross-sectional view of the wireless earphone and the cradle of Embodiment 1.
Figure 3:
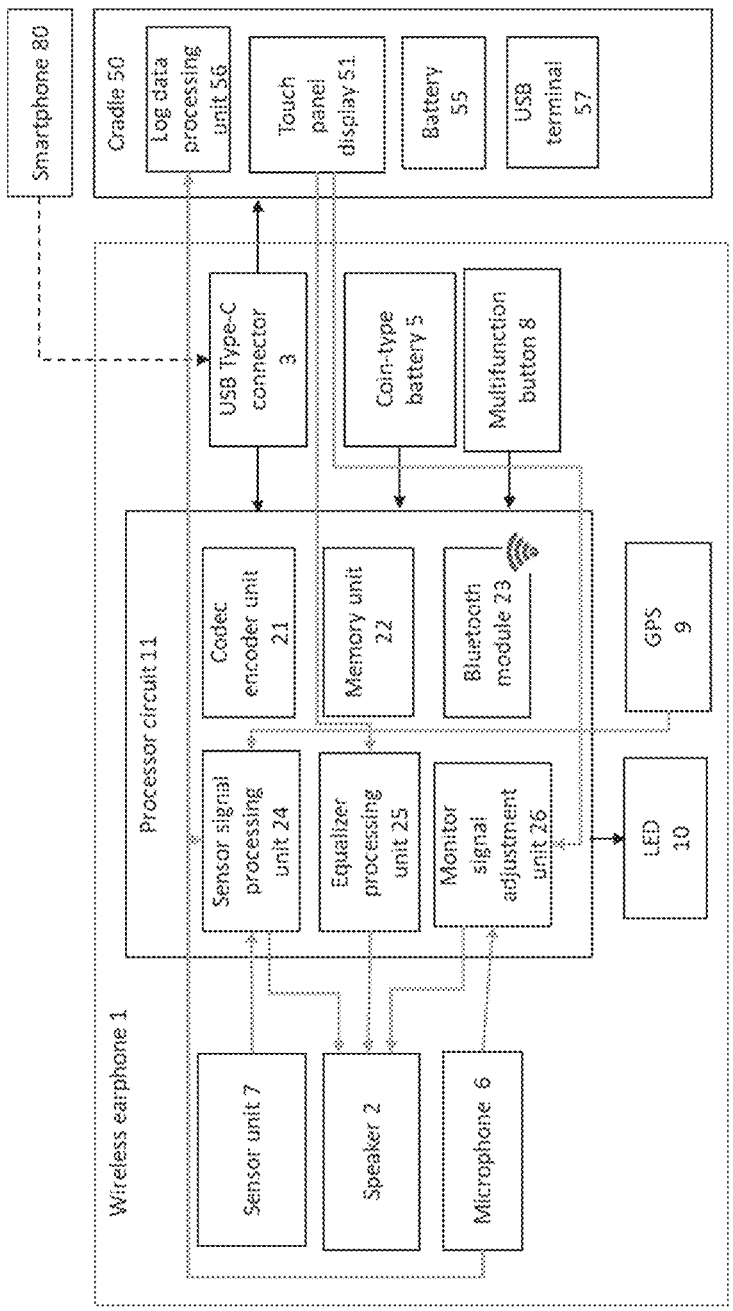
FIG. 3 is a block diagram illustrating a functional configuration of the sound reproduction device in Embodiment 1.

FIG. 1 is an appearance view of wireless earphones and a cradle that constitute a sound reproduction device of Embodiment 1. FIG. 2 is a cross-sectional view of the wireless earphone and the cradle of Embodiment 1. FIG. 3 is a block diagram illustrating a functional configuration of the sound reproduction device in Embodiment 1.

As illustrated in FIG. 1, the sound reproduction device of the present embodiment includes wireless earphones 1 and a cradle 50. The wireless earphones 1 are connected with a player (a smartphone 80 in the example illustrated in FIG. 3) via wireless communication, so as to reproduce music or the like. The cradle 50 is a case in which the wireless earphones 1 are housed when the wireless earphones 1 are carried, and is capable of charging the same.

One of the characteristics of the sound reproduction device of the present embodiment is that the cradle 50 includes a touch panel (touch panel-type display) 51. In the sound reproduction device of the present embodiment, when the wireless earphones 1 are housed in the cradle 50, data accumulated in the wireless earphones 1 can be displayed on the touch panel 51 of the cradle 50, and various settings of the wireless earphones 1 can be carried out with use of the touch panel 51 as a GUI. This allows a user to acquire useful data from the wireless earphones 1 and to perform operations for the setting of the wireless earphones 1 by using the cradle 50, without using a smartphone 80.

FIG. 1 illustrates an exemplary appearance view of the wireless earphones 1 and the cradle 50 of the present embodiment. The left part of the drawing illustrates a state of the wireless earphones 1 before being housed, and the right part of the drawing illustrates a state after the wireless earphones 1 are housed. A battery is built in each of a left-ear wireless earphone 1a and a right-ear wireless earphone 1b, and when the remaining battery level is low, it is necessary to charge the battery. Inside the cradle 50, a left-ear wireless earphone space 58a and a right-ear wireless earphone space 58b are provided, and the left-ear wireless earphone 1a can be housed in the left-ear wireless earphone space 58a, and the right-ear wireless earphone 1*b* can be housed in the right-ear wireless earphone space 58*b* when they are charged. On the top of the cradle 50, an openable top cover 52 is provided so as to prevent dust or moisture from intruding. A touch panel 51 is provided on a front face of the cradle 50.

Conventionally, when any of various types of setting operations for the wireless earphones is carried out, a smartphone, a smartwatch, or the like is connected to the wireless earphones, and instructions for the setting operations are entered via such a device. The configuration of the present embodiment, however, allows a user to invoke various menus using the touch panel 51 to perform touch operations on the screen, thereby performing setting operations for the wireless earphones 1, without using a smartphone or a smartwatch. For example, a user can set acoustic characteristics of the wireless earphones 1, external monitoring functions of the wireless earphones 1, and the like. Details of the setting operations are to be described in conjunction with embodiments described below.

FIG. 2 illustrates an exemplary internal structure of the wireless earphone 1*a* and the cradle 50. The left part of the drawing illustrates a state before the left-ear wireless earphone 1*a* is housed, and the right part of the drawing illustrates a state after it is housed. It should be noted that FIG. 2 illustrates the left-ear wireless earphone 1*a* as an example, and the following description also describes the left-ear wireless earphone 1*a* alone, but the right-ear wireless earphone 1*b* has an identical structure.

In the left-ear wireless earphone 1*a*, a round audio speaker 2 is incorporated, and a coin-type battery 5 is arranged coaxially with the same. On a printed circuit board (PCB) 4, processor circuits, memory circuits, etc. are mounted. A microphone 6 is used for voice input, or for external monitoring. A sensor unit 7 is formed with an acceleration sensor, a gyro sensor, a heart rate sensor, or the like. By pressing a multifunction button 8 of the wireless earphones 1, turning on/off of the wireless earphones 1, connection with the smartphone 80, volume control, etc. can be carried out.

Under the PCB 4, a USB Type-C (registered trademark) connector 3 is provided. When the wireless earphones 1 are forced into the cradle 1, the Type-C connector 3 is connected to a Type-C connector 53 of the cradle 50. Inside the cradle 50, a printed circuit board 54 and a battery 55 are provided. The battery 55 is charged via a USB terminal (not illustrated) from an external AC power source or the like. The wireless earphones 1*a* and 1*b* communicate with the cradle 50 via Bluetooth, so that data acquired by the sensor of the wireless earphones 1 can be displayed on the display 51 in real time.

By using the Type-C connector 53, safety can be improved, which is because, even in a case where a foreign matter intrudes into the wireless earphones 1 or the cradle 50 and causes a short circuit, an abnormality can be detected by the authentication technology on the charging side and the charged side performed by specific integrated circuits (IC) defined by the USB Type-C charging standard. Besides, as the USB is a worldwide standard and widely used, the connector can be connected with a wide variety of battery equipment, and this allows a user to have a wide range of selection. A safety authentication organization relating to the charging of mobile equipment, Mobile Computing Promotion Consortium (MCPC), was established recently, and an authentication system for determining whether a circuit that ensures safety specified by MCPC is provided has been also implemented. An authenticated product is given an authentication mark, so as to be easily distinguished from inferior products. As a USB connector is a product of the unified standard, the connector itself has high reliability; if the circuit safety is validated in the authentication test, the safety of the product is highly evaluated, and achieves recognition.

FIG. 3 is a block diagram illustrating functional constituent elements of the sound information terminal device according to the present embodiment. The wireless earphone 1 includes the speaker 2, the microphone 6, the sensor unit 7, the USB Type-C connector 3, the coin battery 5, the multifunction button 8, the GPS 9, a light-emitting diode (LED) 10, and a processor circuit 11. The processor circuit 11 includes, in the inside thereof, a codec encoder unit 21, a memory unit 22, a Bluetooth module 23, a sensor signal processing unit 24, an equalizer processing unit 25, and a monitor signal adjustment unit 26. The cradle 50 includes the touch panel 51, the battery 55, a USB terminal 57, and a log data processing unit 56. The smartphone 80 and the wireless earphones 1 can transmit/receive data through the connector 3.

As described above, one of the characteristics of the sound reproduction device according to the present embodiment is that the cradle 50 includes the touch panel 51. As the touch panel 51 can be used as the GUI of the wireless earphones 1, the wireless earphones 1 can be operated without using the smartphone 80. As the cradle 50 also serves as a case in which the wireless earphones 1 are housed, a user always carries the same together with the wireless earphones 1. Providing the touch panel 51 as a GUI of the wireless earphone 1 on the cradle 50 will also causes a user to make a habit of housing the wireless earphones 1 in the cradle 50. This also makes it possible to achieve an effect of preventing the wireless earphones 1 from being lost.

The memory unit 22 of the processor circuit 11 is formed with a rewritable recording device such as a flash memory, which makes it possible to upgrade the firmware of the wireless earphones 1. It is possible to rewrite the firmware of the wireless earphones via wireless communication in a case where the amount of data is small, like a case of a simple bug fix; however, in a case where the amount of data of a firmware to be written is large, like a case of addition of a new function, the data transfer rate or capacity is limited in the wireless communication. Therefore, in a case of a configuration wherein the firmware upgrading is possible only via wireless communication, there is a drawback in that the addition of a function is also limited. In contrast, in a case of the configuration wherein the cradle 50 and the wireless earphones 1 are connectable with the USP Type-C connector 3, as is the case with the present embodiment, the firmware may be downloaded in a memory (not illustrated) of the cradle 50 in advance, whereby, when the wireless earphones 1 are housed in the cradle 50, the firmware is read from the cradle 50 into the memory unit 22 of the wireless earphones 1 for upgrading. Incidentally, the reading of the firmware into the memory of the cradle 50 can be achieved by the connection of the USB terminal 57 with a PC or the like.

Incidentally, the upgrading of the firmware may be achieved by, other than the method via the cradle 50, directly connecting the wireless earphones 1 to a PC or the like with use of the USB Type-C connector 3 of the wireless earphones 1 so that the firmware is downloaded from the PC.

As is described above, the wireless earphones 1 has the USB Type-C connector 3, whereby the firmware having data of a large capacity can be read and upgraded in a short time. For example, recently it is expected to processing a further advanced learning function such as a speech recognition system and an automatic translation function, called "Artificial Intelligence (AI)", with the processor circuit 11 of the earphones. The configuration of the present embodiment is also effective when new AI functions, biological signal processing functions, and the like are added in future.

For example, in a case where the wireless earphones 1 are given an AI function, the cradle 50, if provided with a speaker (not illustrated), can be used as an AI speaker. The "AI speaker" is a speaker wherein an AI assistant corresponding to interactive voice operation can be used, and recently it is widely used for various applications via Internet, such as music appreciation, use of search service, and shopping. With this configuration, an output from the AI function of the wireless earphones 1 (for example, information, advice, music, etc., provided from AI) can be listened to by not only a wireless earphone 1 wearer but also his/her friends or family around him/her. Besides, as the cradle 50 is portable, there is an advantage that the AI functions of the wireless earphones 1 can be used in various places such as in the outdoors, in a car, etc., unlike an installed AI speaker.

Further, in this case, the cradle 50 may be provided with not only a speaker but also a microphone (not illustrated), which makes it possible to allow a person other than the user of the wireless earphones 1 to give a voice instruction to the AI function via the microphone of the cradle 50.

Still further, as the wireless earphones 1 are not provided with a display, conventionally a display terminal such as a smartwatch or a smartphone is required in some cases to visually confirm data accumulated in the wireless earphones 1, or to make a change in setting contents while viewing the same. In the case of the sound reproduction device of the present embodiment, however, such a display terminal is unnecessary, which simplifies the link between devices, thereby reducing an economic burden on a user.

Incidentally, operations of the wireless earphones 1 using the touch panel 51 as a GUI can be performed in a state in which the wireless earphones 1 are worn in the ears, not being housed in the cradle 50. In this case, the wireless earphones 1 and the cradle 50 communicate via Bluetooth.

Embodiment 2

The following description describes Embodiment 2 of the present invention. It should be noted that constituent elements having the same functions as those of the constituent elements described in conjunction with Embodiment 1 are denoted by the same reference marks, and detailed descriptions of the same are omitted. This applies to the respective embodiments described below.

Figure 4:
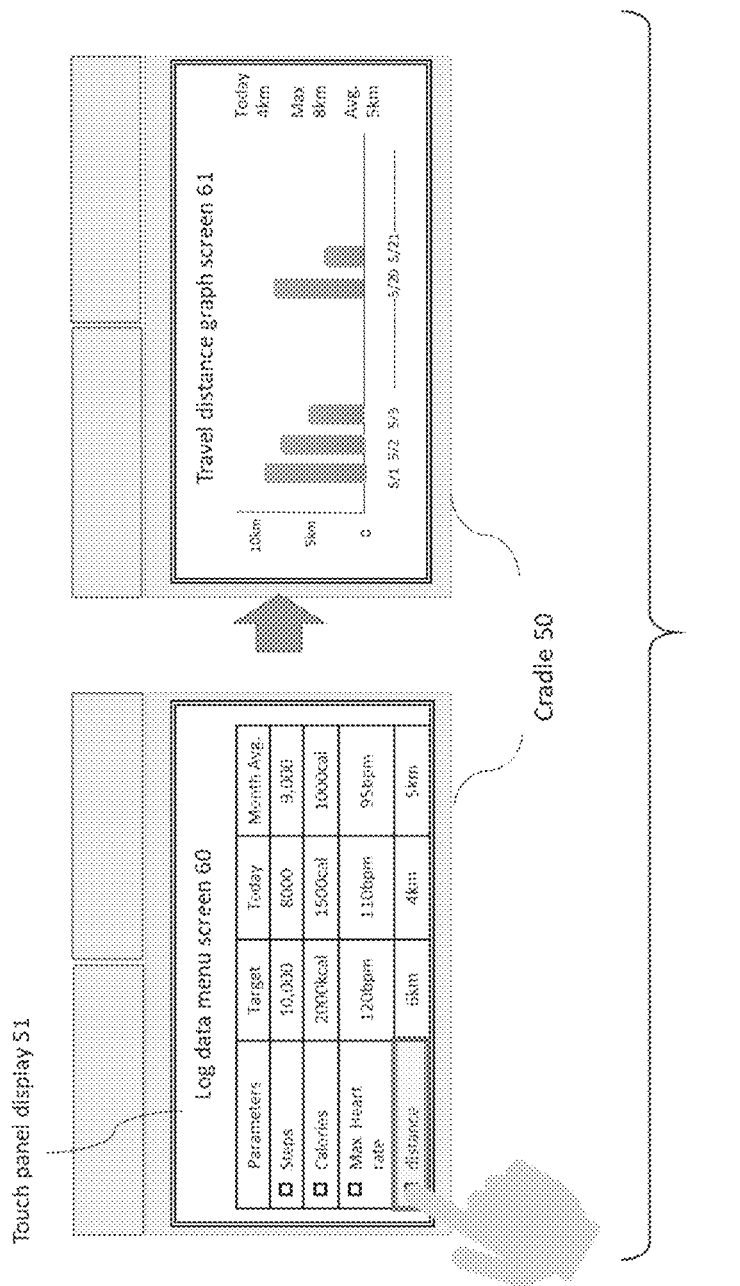
FIG. 4 illustrates a cradle and a touch panel display example 1 in Embodiment 2.
Figure 5:
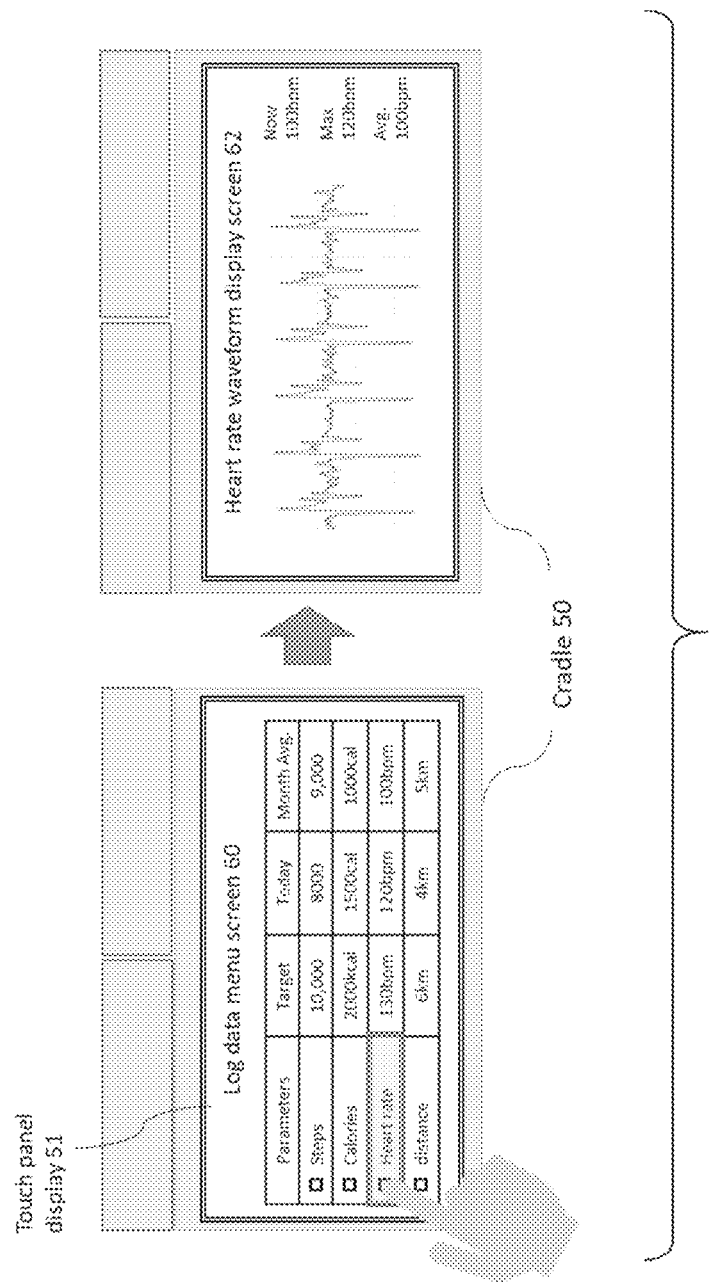
FIG. 5 illustrates a cradle and a touch panel display example 2 in Embodiment 2.

FIGS. 4 and 5 illustrate display examples on the touch panel 51 of the cradle 50 in Embodiment 2. The left part of each drawing illustrates a menu screen 60 showing fitness log data, and the right part of each drawing illustrates a graph display screen 61 showing a graph made from the log data selected on the menu.

In the present embodiment, the sensor unit 7 includes an acceleration sensor, a gyro sensor, a heart rate sensor, and the like. Data acquired by the sensor unit 7 are taken into and processed by the sensor signal processing unit 24 of the processor 11, and are accumulated in the memory unit 22. With this configuration, when a user wears the wireless earphones 1 and takes exercise, data relating to the exercise (e.g., a distance of walking or running, a step count, a speed, consumed calories, a heart rate, etc.) can be accumulated in the memory unit 22.

In the present embodiment, when the wireless earphones 1 are housed in the cradle 50, data accumulated in the memory unit 22 are transferred via the connector 3 to the cradle 50, and the log data processing unit 56 receives the same. The log data processing unit 56 processes the data transferred from the memory unit 22 of the wireless earphones 1, generates a graph or the like, and displays the same on the touch panel 51.

It should be noted that the sensor unit 7 and the memory unit 22 may be provided in only either the left-ear wireless earphone 1a or the right-ear wireless earphone 1b, or may be provided in each of the same.

In the case where the sensor unit 7 and the memory unit 22 are provided in each of the left-ear wireless earphone 1a and the right-ear wireless earphone 1b, sensor data are acquired from each of the left-ear and right-ear wireless earphones, and are accumulated in the memory unit 22. In addition, in this case, when the wireless earphones 1 are housed in the cradle 50, data are sent from each of the memory units 22 of the left-ear and right-ear wireless earphones 1a and 1b to the log data processing unit 56 of the cradle 50. This also makes it possible for the log data processing unit 56 to separately display the respective processed results of the log data relating to the left and right ears, which enables to monitor changes in the body functions and balance. Needless to say, in a case where a user is resistant to wearing both of the wireless earphones all the time, an identical effect can be expected even in a case where either the left one or the right one of the wireless earphones is worn.

In the example illustrated in FIG. 4, when a user selects "distance" by a touching operation on the touch panel 51 as illustrated in the left part of the drawing, the display on the touch panel 51 is switched so as to display a graph of a travel distance as the processing result of the log data processing unit 56, as illustrated in the right part of the drawing. On a side of the graph, the travel distance of today, as well as the maximum travel distance and the average travel distance in a predetermined period are displayed in numerical values (in text).

Further, in the example illustrated in FIG. 5, when a user selects "Heart rate" as illustrated in the left part of the drawing, the display on the touch panel 51 is switched so as to display a heart rate waveform as illustrated in the right part of the drawing. On a side of the heart rate waveform, the current heart rate, the maximum heart rate and the average heart rate in a predetermined period are displayed in text. Even while a user is wearing the wireless earphones 1, the wireless earphones 1 and the cradle 50 can be connected via Bluetooth, which makes it possible to have the output of the sensor signal processing unit 24 displayed in real time. For example, while listening to music with the wireless earphones 1 and exercising yoga, a user can grasp the state of his/her body on the screen displayed on the touch panel 51. In FIG. 5, biological data detected from the left ear or the right ear are displayed, but alternatively, both of data detected from the left ear and the right ear may be compared and displayed. Comparing detected data of the left and right sides enables to monitor changes in the body functions and balance.

Incidentally, other than the method using the heart rate sensor, another method for detecting the heart rate is available, in which used is measurement equipment that uses a microphone that can detect vibration of air caused by vibration of skin or tympanic membrane accompanied with pulsation of a blood vessel, wherein the microphone and a pulsation source are placed in a closed space so as to detect a pulsation signal.

Figure 6:
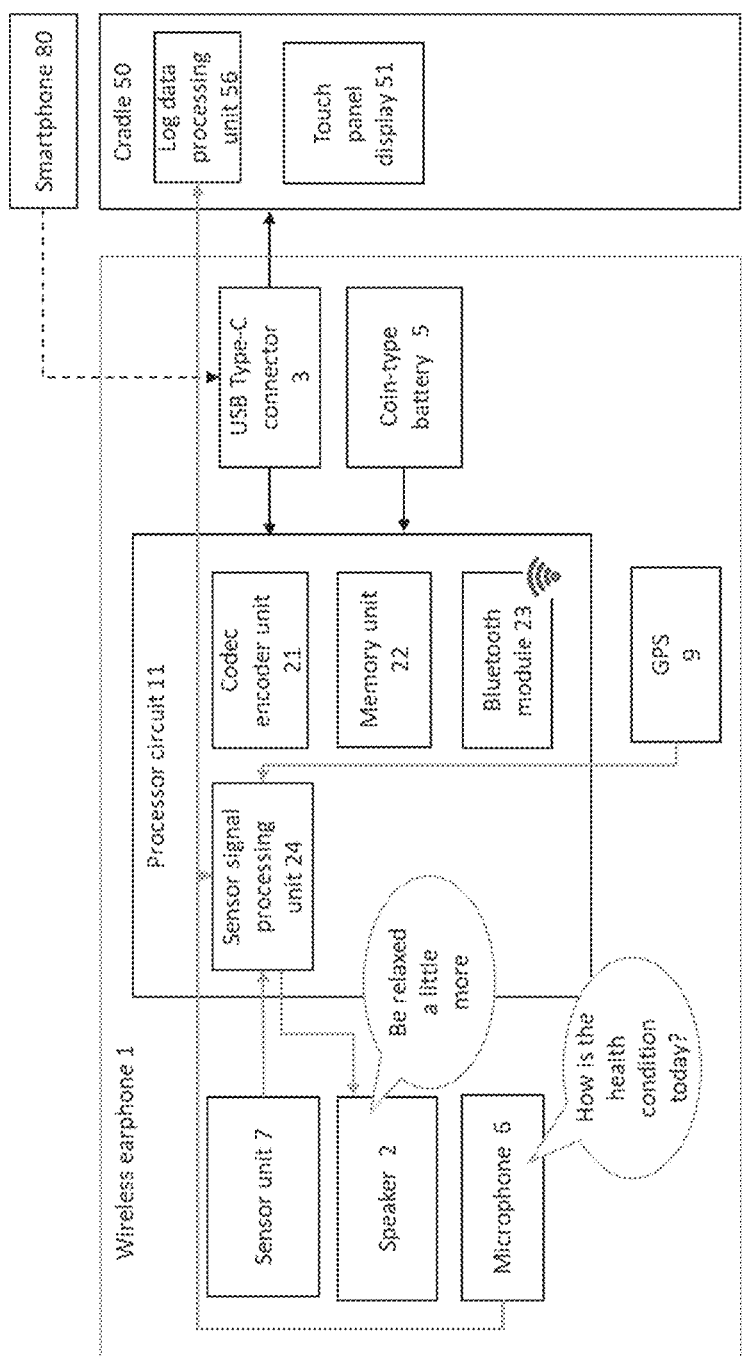
FIG. 6 is a block diagram of wireless earphones and the cradle of Embodiment 2.

FIG. 6 is a block diagram of wireless earphones and a cradle of Embodiment 2. The following description will describe an exemplary function of the block diagram illustrated in FIG. 6. When a user asks by voice, "how is the health condition today?", then the microphone 6 detects the speech, the processor 11 recognizes the speech, and thereafter, a computation result obtained by comparing past data accumulated in the memory unit 22 and the log data processing unit 56 of the cradle 50 with real time data detected by the sensor unit 7 is conveyed as a message to the user via a speaker. For example, appropriate advice such as "be relaxed a little more" can be made by voice. Further, in a case where a user is running a long distance, it is possible to convey, by voice, a distance to a destination, a lap time, physical condition, and the like as a result of computation based on the position information obtained by the GPS 9 and a travel distance.

As is described above, with the sound reproduction device of the present embodiment, analysis results of motion information and biological information acquired by the sensor of the wireless earphones 1 can be displayed on the touch panel 51 of the cradle 50, during the charging time, or alternatively, in real time.

Conventionally there have been smartwatches as wearable terminals that detect a heart rate with a heart rate sensor from a user's wrist, detect a travel distance and consumed calories with use of the GPS function, and display the detection results on dial displays in real time. In a case of such a smartwatch, however, it is necessary to transfer data of the smartwatch to a smartphone in order to confirm past training history. In contrast, with the sound reproduction device according to the present embodiment, a user does not need a smartphone to confirm past data and analysis results of the same.

Additionally, in the present embodiment, an image of a famous athlete or the like may be displayed when an advice relating to a result of a processing operation by the log data processing unit 56 is output and displayed on the touch panel 51 of the cradle 50. Further, when an advice is output from the speaker of the cradle 50, the advice may be reproduced with a voice of a famous athlete or the like. This makes it possible to improve motivation for continuing exercise.

Embodiment 3

The following description describes a sound reproduction device of Embodiment 3. The sound reproduction device according to the present embodiment is characterized in that a user can operate the touch panel 51 of the cradle 50 in a state of wearing the wireless earphones 1 so as to set frequency characteristics of the wireless earphones 1.

Figure 7:
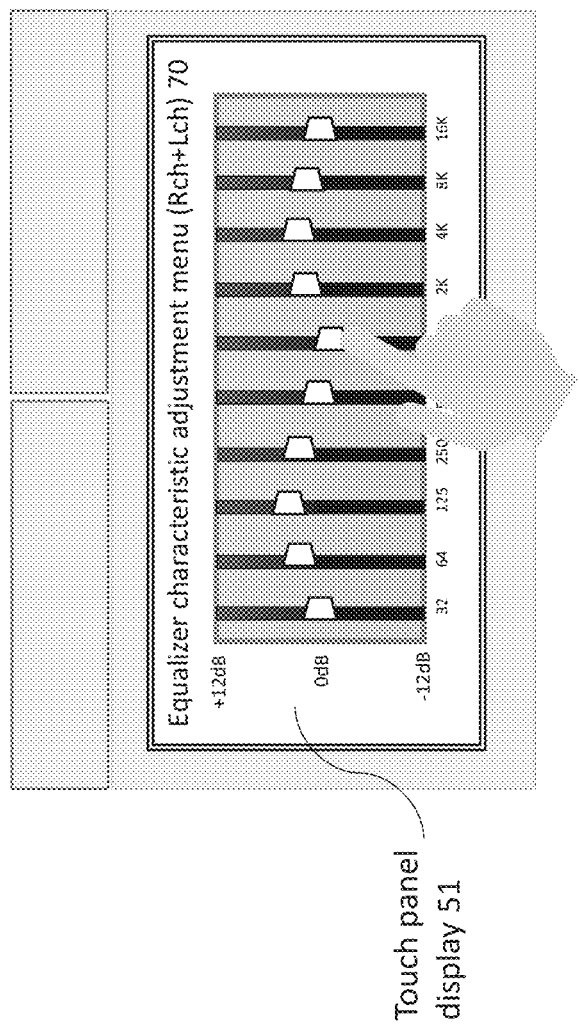
FIG. 7 illustrates a cradle and a touch panel display example in Embodiment 3.

FIG. 7 illustrates a display example on the touch panel 51 of the cradle 50. In this example, a GUI display of a menu 70 for adjusting audio equalizer characteristic is displayed on the touch panel 51. To change respective levels of the frequencies, slide bars displayed in the menu 70 are touched and moved with a finger so as to slide upward or downward, whereby the frequency characteristics of the earphones 1 can be set according to preference. Incidentally, this example indicates a case where both of the R channel and the L channel are set at the same time, but these cannels can be set separately.

Figure 8:
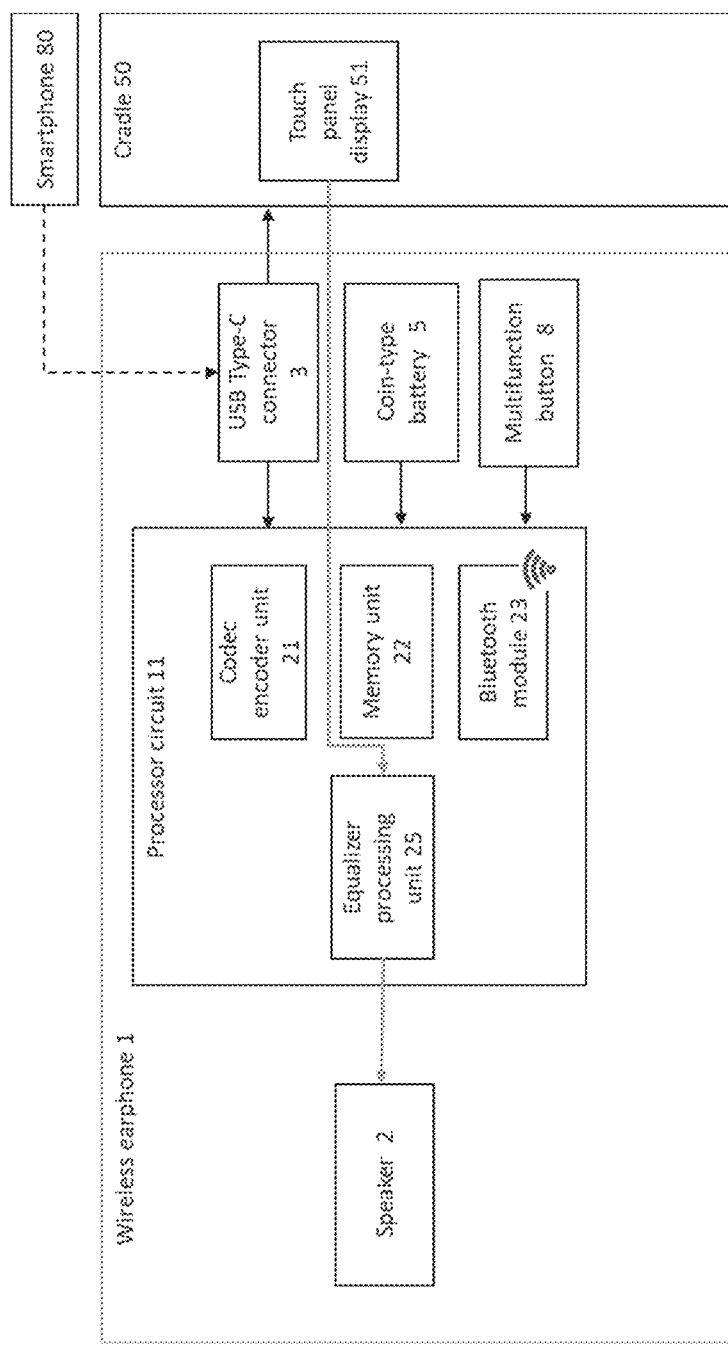
FIG. 8 is a block diagram of wireless earphones and the cradle of Embodiment 3.

FIG. 8 illustrates blocks relating to the above-described processing operation for setting the frequency characteristics, which are extracted from the functional blocks illustrated in FIG. 3. In other words, only in order to realize the functions of the present embodiment, the functional blocks not illustrated in FIG. 8, among the functional blocks illustrated in FIG. 3, can be omitted.

When a user operates the touch panel 51 of the cradle 50, an instruction corresponding to the operation is sent via the Bluetooth connection between the cradle 50 and the wireless earphones 1, to the equalizer processing unit 25 of the processor circuit 11. Incidentally, the encoder 21, the memory unit 22, and the Bluetooth module 23 are also involved in the communication between the touch panel 51 and the equalizer processing unit 25, but the illustration of the same is omitted in FIG. 8. The equalizer processing unit 25 changes the levels of frequency bands according to the instruction, and outputs reproduction sounds according to the changed frequency characteristics, to the speaker 2. Incidentally, sound sources for the reproduction sounds herein may be supplied from the player 80, or alternatively, may be those stored in the memory unit 22.

As is described above, in the present embodiment, the sound reproduction device is characterized in that a user can operate the touch panel 51 of the cradle 50 in a state of wearing the wireless earphones 1 in the ears so as to adjust the equalizer characteristics of the wireless earphones 1 while listening to reproduction sounds from the speakers 2 of the wireless earphones 1.

Incidentally, in the foregoing description, an example is described in which a user in a state of wearing the wireless earphones 1 in the ears adjusts the equalizer characteristics while listening to reproduction sounds; however, it is also possible for a user to adjust the equalizer characteristics in a state in which the wireless earphones 1 are house in the cradle 50.

Incidentally, the configuration according to the present embodiment can be applied to a form in which the wireless earphones 1 are used as a hearing aid. In other words, the foregoing description is described with reference to an exemplary setting of the frequency characteristics in a case where audio is reproduced with the wireless earphones 1; however, in a case where the wireless earphone 1 includes the microphone 6 (see FIGS. 2 and 3) and takes external sounds in through the microphone 6 to reproduce the same, the wireless earphones 1 can be used as a hearing aid.

Incidentally, as the distribution of a band of frequencies that a user has difficulty in hearing varies from person to person, conventional hearing aids have been characterized in that a user has to go to a shop that specializes in hearing aids (a shop handling hearing aids) so as to have the hearing aids adjusted by specialists. With the configuration of the present embodiment, a user wearing the wireless earphones 1 can operate the touch panel 51 of the cradle 50 so as to adjust frequency characteristics of reproduction sounds, while listening to reproduction of external sounds taken in through the microphone 6. In other words, on the display screen of the touch panel 51 illustrated in FIG. 7, a user adjusts respective frequency bands so that reproduced sounds of external sounds have such sound acoustic pressures that make the sounds hearable. This allows a user him/herself to easily adjust a hearing aid, without going to a shop that specializes in hearing aids.

Further, a voice test tool (software) may be prepared and downloaded to the memory unit 22 of the wireless earphone 1 via the cradle 50, so as to be executed by the processor circuit 11 of the wireless earphone 1; this makes it possible to allow a user to, for example, conduct regular tests, slight adjustments, and the like, without difficulty.

Embodiment 4

Figure 9:
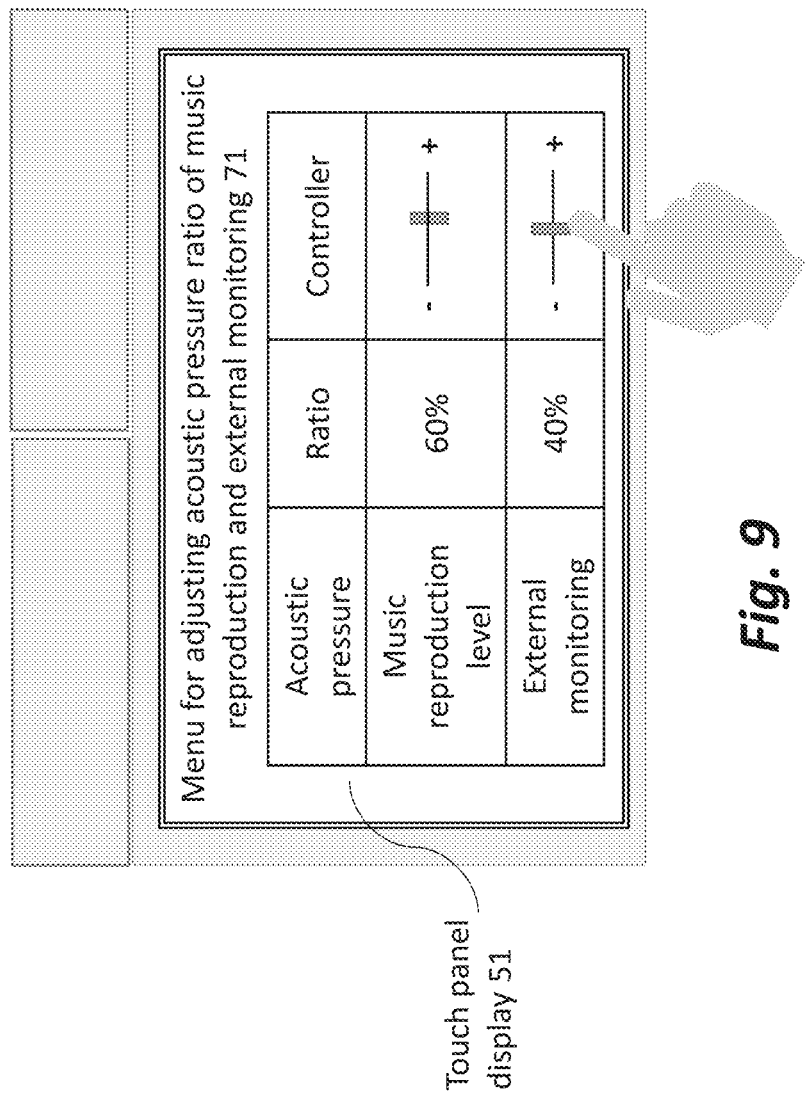
FIG. 9 illustrates a cradle and a touch panel display example in Embodiment 4.

FIG. 9 illustrates a cradle and a display example on a touch panel in Embodiment 4, displaying a level adjustment menu 71 for adjusting acoustic pressure ratio of the music reproduction level and the external monitoring. A user moves the music reproduction level and the external monitoring level by sliding the same right/leftward with a finger on the touch panel 51, so as to view and listen at an acoustic pressure ratio according to preference. For example, the acoustic pressure ratio may be set so that, in walking outdoors, the ratio of music to monitoring is 60% to 40% for safety, and in a room, the ratio of music to monitoring is 90% to 10%; thus, a user can set the acoustic pressure ratio according to his/her actions and environments. In a case where music is not reproduced, the music level is turned off and the external monitoring level is turned on, whereby the wireless earphones 1 can be used as a hearing aid. Needless to say, the setting for the right ear and the setting for the left ear are separately performed, so as to compensate hearings and characteristics that are different between the right and left ears.

Figure 10:
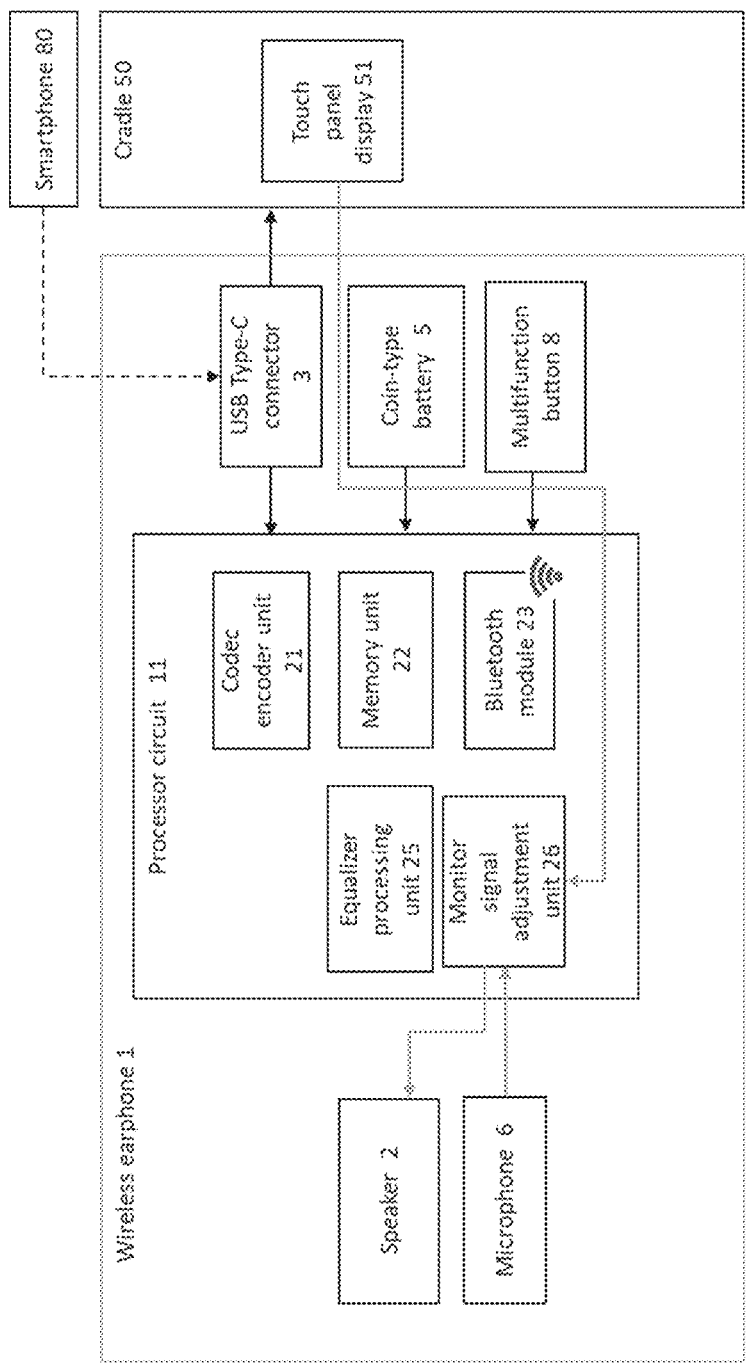
FIG. 10 is a block diagram of wireless earphones and the cradle of Embodiment 4.

FIG. 10 illustrates blocks relating to the above-described processing operation for setting the acoustic pressure ratio, which are extracted from the functional blocks illustrated in FIG. 3. In other words, only in order to realize the functions of the present embodiment, the functional blocks not illustrated in FIG. 10, among the functional blocks illustrated in FIG. 3, can be omitted.

When a user operates the touch panel 51 of the cradle 50, an instruction corresponding to the operation is sent via the Bluetooth connection between the cradle 50 and the wireless earphones 1, to the monitor signal adjustment unit 26 of the processor circuit 11. Incidentally, the encoder 21, the memory unit 22, and the Bluetooth module 23 are also involved in the communication between the touch panel 51 and the equalizer processing unit 25, but the illustration of the same is omitted in FIG. 10. The monitor signal adjustment unit 26 changes the ratio of the music reproduction level and the external monitoring level according to the instruction, and outputs reproduction sounds according to the changed acoustic pressure ratio, to the speaker 2. Incidentally, sound sources for the reproduction sounds herein may be supplied from the player 80, or alternatively, may be those stored in the memory unit 22.

As is described above, in the present embodiment, the sound reproduction device is characterized in that a user can operate the touch panel 51 of the cradle 50 in a state of wearing the wireless earphones 1 in the ears so as to adjust the equalizer characteristics of the wireless earphones 1 while listening to reproduction sounds from the speakers 2 of the wireless earphones 1.

Incidentally, in the foregoing description, an example is described in which a user, in a state of wearing the wireless earphones 1 in the ears and listening to reproduction sounds, adjusts the ratio of the music reproduction level and the external monitoring level; however, it is also possible for a user to perform the adjustment in a state in which the wireless earphones 1 are house in the cradle 50.

Embodiment 5

Figure 11:
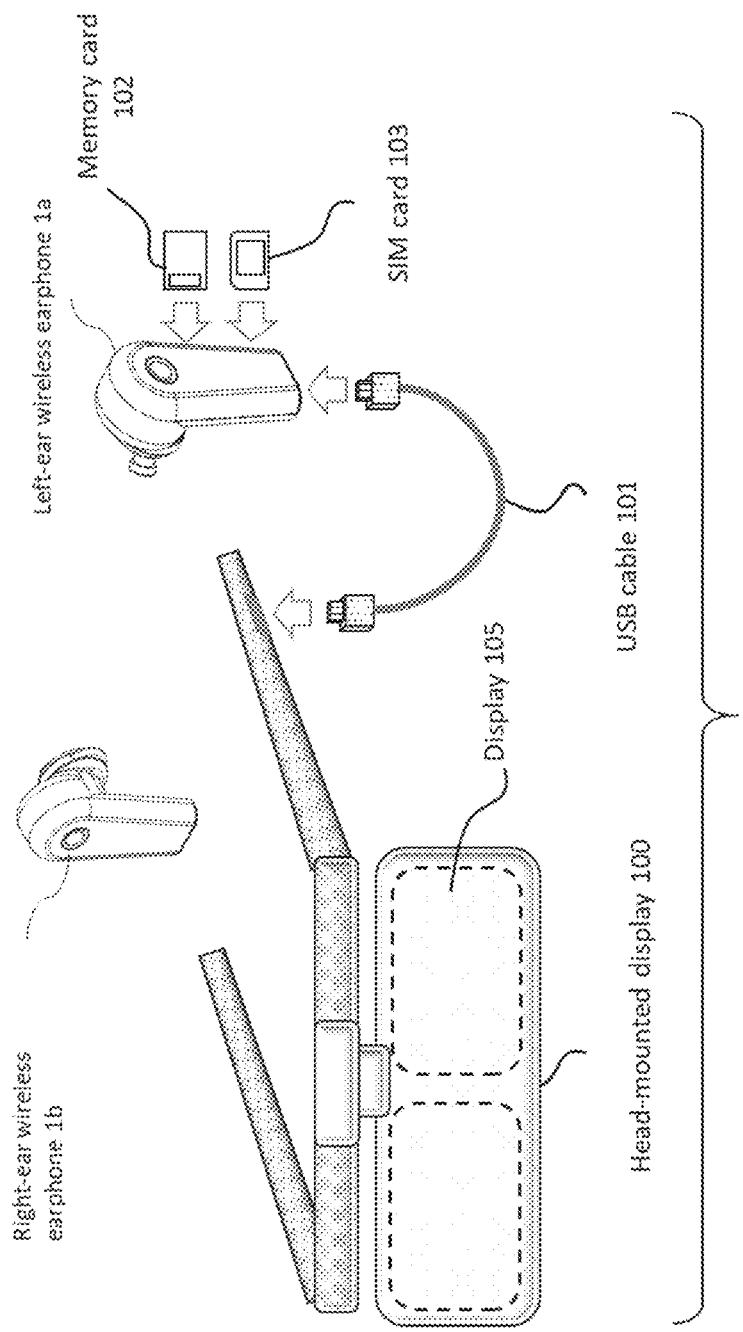
FIG. 11 is a conceptual view of wireless earphones and a head-mounted display of Embodiment 5.

FIG. 11 is a conceptual view of wireless earphones and a head-mounted display of Embodiment 5. The present embodiment relates to a video audio reproduction device that a head-mounted display 100 further includes.

The USB terminal of the right-ear wireless earphone 1b and a USB terminal of the head-mounted display (hereinafter abbreviated as "HMD") 100 are connected via a USB cable 101, so that video information accumulated in the wireless earphone 1b can be viewed and listened to with use of the HMD 100. A video image processing circuit for the HMD is formed in a frame body of the wireless earphone 1b. Video data can be stored in a memory card 102, too. In other words, the wireless earphone 1 further includes a slot in which the memory card 102 can be installed.

Further, the wireless earphone 1 also further includes a slot in which a SIM card 103 is incorporated. The installation of the SIM card 103 enables not only telephone communication, but also audio and video streaming reproduction. FIG. 11 illustrates an exemplary configuration using the HMD 100 for virtual reality (VR), but it is possible to use a HMD 100 for augmented reality (AR). As the right-ear and left-ear wireless earphones 1a, 1b are connected via Bluetooth, the USB cable 101 may be connected to either one of the right-ear and left-ear wireless earphones so as to enable viewing and listening with stereo sound. As a user can listen to sounds corresponding to video images on the HMD 100 with one wireless earphone on one side alone, he/she may wear one wireless earphone on one side in a case where he/she, when going out, wants to simultaneously listen to external sounds, too. In such a state, AR contents can be enjoyed safely with the HMD for AR. Needless to say, both of the earphones may be connected to the HMD, or the memory card 102 and the SIM card 103 may be incorporated in one of the right-ear and left-ear wireless earphones 1.

Figure 12:
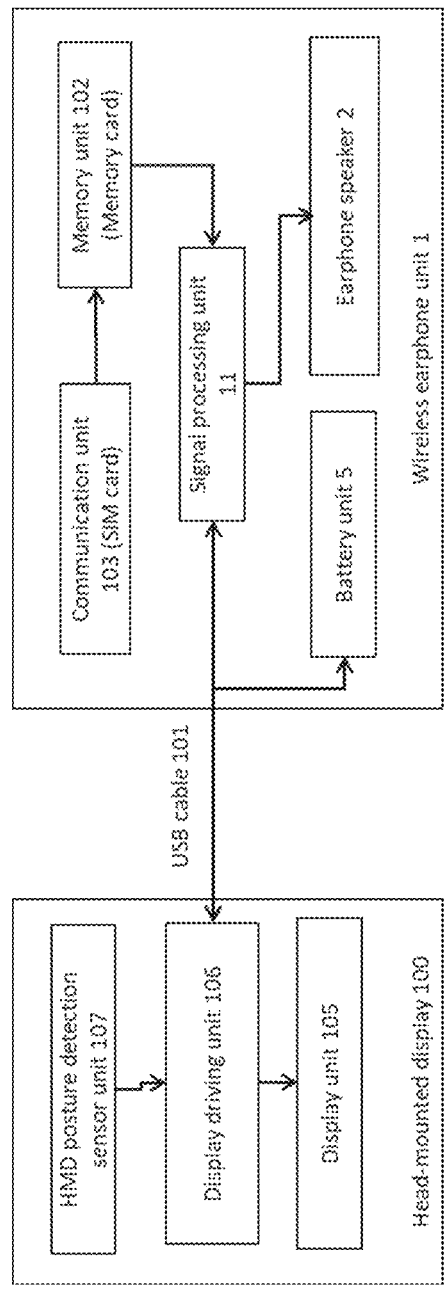
FIG. 12 is a block diagram of wireless earphones and a head-mounted display of Embodiment 5.

FIG. 12 is a block diagram of wireless earphones 1 and a head-mounted display 100 of Embodiment 5. The wireless earphone 1 further includes a communication unit 103 (e.g., a SIM card), and a memory unit 102 (e.g., a memory card). Incidentally, though illustration is omitted in FIG. 12, the functional blocks illustrated in FIG. 3 and the like exist also in the wireless earphones 1 of the present embodiment.

The HMD 100 is formed with a display unit 105, a display driving unit 106, and a HMD posture detection sensor 107. The wireless earphones 1 and the HMD 100 are connected by a USB cable 101. Video data and audio data for streaming are input from the communication unit 103, and are accumulated in the memory unit 102. The processor circuit 11 decodes video and audio data. The video data are transferred via the USB cable to the HMD 100, and the display driving unit 106 controls the display of the display unit 105 according to the video data. Sounds are output to the speaker 2. The HMD posture detection sensor unit 107 detects a user's posture, and the detected information is sent via the USB cable 101 to the processor circuit 11. In the processor circuit 11, video information and audio information that a user is viewing and listening to are subjected to rendering processing, whereby video images and sounds having high presence can be reproduced. The battery 5 is incorporated in the wireless earphone unit 1; however, an additional battery may be further provided in the HMD 100 so as to realize long-time reproduction.

Techniques disclosed in the specification of the present invention are described above in detail, with reference to specific embodiments. It is however obvious that correction and alteration can be made in the embodiments by the parties concerned, without departing from the spirit of the techniques disclosed in the specification of the present invention.

DESCRIPTION OF REFERENCE NUMERALS

1: wireless earphone
2: audio speaker

3: Type-C connector
5: coin-type battery
50: cradle
51: touch panel
52: openable top cover
58: wireless earphone space

The invention claimed is:

1. A sound reproduction device comprising a wireless earphone, and a cradle that houses the wireless earphone, wherein
the cradle includes:
a rechargeable battery for charging the wireless earphone; and
a touch panel that functions as an input/output interface for the wireless earphone,
the wireless earphone includes a sensor unit that acquires sensor information that contains at least either motion information or biological information of a user, and
the cradle further includes a data processing unit that receives the sensor information from the sensor unit and performs display based on the sensor information on the touch panel.

2. The sound reproduction device according to claim 1, wherein the wireless earphone includes a left-ear earphone and a right-ear earphone, and
the left-ear earphone and the right-ear earphone are configured so as to be independent from each other.

3. The sound reproduction device according to claim 1, wherein the cradle includes a data transfer port for connection with the wireless earphone housed in the cradle.

4. The sound reproduction device according to claim 1, wherein the wireless earphone includes a microphone.

5. The sound reproduction device according to claim 4, wherein a voice instruction is received through the microphone.

6. The sound reproduction device according to claim 1, wherein the wireless earphone further includes a position acquisition unit that acquires coordinate information of a current position.

7. The sound reproduction device according to claim 1, wherein the wireless earphone further includes a voice communication unit that performs voice communication with another terminal.

8. The sound reproduction device according to claim 1, wherein the data processing unit updates display based on the sensor information in real time on the touch panel.

9. The sound reproduction device according to claim 1, wherein the sensor unit acquires the sensor information from the user's right and left ears, and
the data processing unit displays the sensor information acquired from the right and left ears, in such a manner that the sensor information acquired from the right ear and the sensor information acquired from the left ear can be compared on the touch panel.

10. A sound reproduction device comprising a wireless earphone, and a cradle that houses the wireless earphone, wherein
the cradle includes:
a rechargeable battery for charging the wireless earphone; and
a touch panel that functions as an input/output interface for the wireless earphone,
the wireless earphone further includes an equalizer processing unit that adjusts acoustic frequency characteristics of the wireless earphone, and
the equalizer processing unit receives setting of the acoustic frequency characteristics via the touch panel.

11. The sound reproduction device according to claim 10, wherein the wireless earphone includes a microphone, and functions as a hearing aid that reproduces external sound that is taken in through the microphone.

12. The sound reproduction device according to claim 10, wherein the touch panel separately receives setting for the left ear and setting for the right ear.

13. A sound reproduction device, comprising a wireless earphone, and a cradle that houses the wireless earphone, wherein
the cradle includes:
a rechargeable battery for charging the wireless earphone; and
a touch panel that functions as an input/output interface for the wireless earphone,
the wireless earphone includes a microphone,
the wireless earphone further includes a monitor signal adjustment unit that adjusts an acoustic pressure ratio between a reproduction level of the wireless earphone and a monitoring level of external environments acquired through the microphone, and
the monitor signal adjustment unit receives setting of the acoustic pressure ratio via the touch panel.

14. A sound reproduction device according to claim 1, comprising a wireless earphone, and a cradle that houses the wireless earphone, wherein
the cradle includes:
a rechargeable battery for charging the wireless earphone; and
a touch panel that functions as an input/output interface for the wireless earphone, and
the sound reproduction device further includes:
a reproduction circuit that is capable of reproducing video contents; and
a port that is capable of transferring video data reproduced by the reproduction circuit to a head-mounted display.

15. The sound reproduction device according to claim 14, further comprising:
a slot in which a recording medium that is capable of storing the video contents is installed.

16. The sound reproduction device according to claim 14, further comprising:
a slot in which a communication control medium for receiving the video contents is installed.

17. A sound reproduction device comprising a wireless earphone, and a cradle that houses the wireless earphone, wherein
the cradle includes:
a rechargeable battery for charging the wireless earphone; and
a touch panel that functions as an input/output interface for the wireless earphone,
the cradle includes a data transfer port for connection with the wireless earphone housed in the cradle,
the wireless earphone further includes a writable memory unit, and
writing to the memory unit via the data transfer port can be carried out in a state in which the wireless earphone is housed in the cradle.

* * * * *